Figure 1:
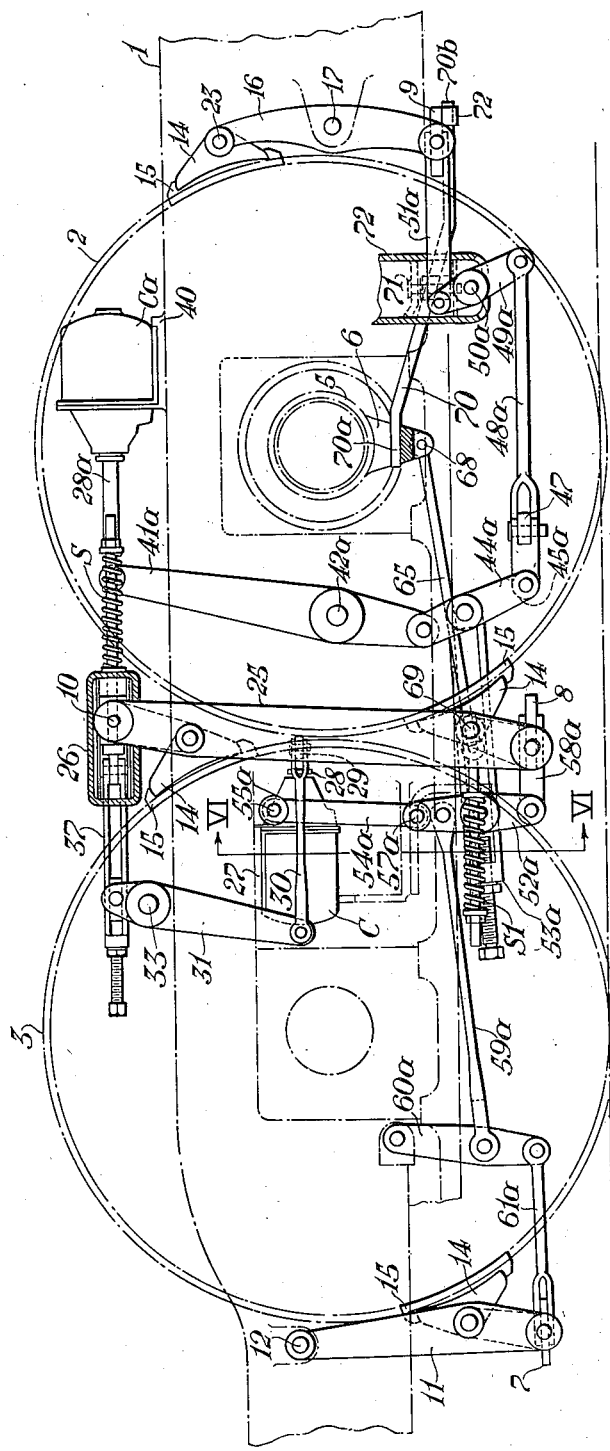

March 10, 1942.  E. G. MUELLER  2,275,916
BRAKE MECHANISM
Filed Jan. 31, 1941  3 Sheets-Sheet 1

INVENTOR
Emil G. Mueller
BY
HIS ATTORNEY

March 10, 1942.  E. G. MUELLER  2,275,916
BRAKE MECHANISM
Filed Jan. 31, 1941  3 Sheets-Sheet 2

INVENTOR
Emil G. Mueller
BY
HIS ATTORNEY

March 10, 1942.  E. G. MUELLER  2,275,916
BRAKE MECHANISM
Filed Jan. 31, 1941  3 Sheets—Sheet 3

INVENTOR
Emil G. Mueller
BY
HIS ATTORNEY

Patented Mar. 10, 1942

2,275,916

UNITED STATES PATENT OFFICE 2,275,916

BRAKE MECHANISM

Emil G. Mueller, Swissvale, Pa., assignor to The American Brake Company, Swissvale, Pa., a corporation of Missouri Application January 31, 1941, Serial No. 376,786

16 Claims. (Cl. 188—46)

My invention relates to brake mechanism, and particularly to brake mechanism for applying clasp brakes to the driving wheels of locomotives.

In modern high speed locomotives it is frequently desirable to arrange the wheels of adjacent pairs of driving wheels as closely together as the necessary clearance between the wheels themselves will permit in order to keep the overall length of the locomotive to a minimum to facilitate the negotiation of curves by the locomotive. It is also frequently desirable to arrange one or more of the driving wheels for lateral movement with respect to the locomotive frame to enable the wheels to freely follow the track rails on curves or uneven stretches of track without undue sidethrust of the wheels on the rails.

When the driving wheels of a locomotive are arranged closely together in the manner described, there is, of course, no room for mounting any part of the brake mechanism directly between the wheel centers, and the available space between the wheels above their centers is frequently limited by the valve gear or other parts of the locomotive, while the space between the wheels below their centers is limited by the diameters of the wheels and the necessary track clearance which must be provided. As a result, if the driving wheels have relatively small diameters, the only way in which clasp brakes can be applied to the wheels is to place the brake shoe on one side of each wheel some distance below the plane passing through the wheel centers, and the brake shoe on the other side of each wheel some distance above the plane passing through the wheel centers. With this arrangement there will be two brake shoes between each two adjacent closely spaced wheels on the same side of the locomotive, and these two shoes will be oppositely disposed and will cooperate with different wheels, thus making it difficult to provide a satisfactory mechanism for properly supporting and operating the brake shoes.

One object of my present invention is to provide an improved mechanism which makes it possible to satisfactorily support and operate brake shoes arranged as above described on a locomotive of the type described.

Another object of my invention is to provide means for maintaining those brake shoes which are associated with the wheels which are permitted to move laterally in lateral alignment with the wheel rims to insure efficient braking on these wheels and to avoid undue wear on the brake rigging.

A further object of my invention is to provide brake mechanism which can be satisfactorily mounted within the limited space available for the brake rigging on a locomotive of the type described without interference from or with the other parts of the locomotive.

According to my invention, the two brake shoes which are disposed between the closely spaced wheels of contiguous pairs of wheels are secured some distance above and below, respectively, the plane passing through the wheel centers to inwardly offset portions formed on the opposite ends of a vertically disposed supporting lever, the main parts of which are located outside of the planes of the wheels. The two supporting levers disposed at the opposite sides of the locomotive, in turn, are pivotally supported at their upper ends on the opposite ends of a horizontally disposed brake beam which is slidably supported adjacent its ends by means of brackets rigidly attached to the locomotive frame, and these supporting levers are connected together at their lower ends by another brake beam which is supported entirely by the levers. The brake shoes at the rear sides of the rear pair of closely spaced wheels are supported by hanger levers which are connected together at their lower ends by means of a brake beam, and the brake shoes at the forward sides of the forward pair of closely spaced wheels are supported by pairs of supporting levers which are pivoted intermediate their ends to the locomotive frame and are connected together at their lower ends by another brake beam. The upper brake beam which is disposed between the closely spaced wheels is actuated by one brake cylinder through one set of interconnected rods and levers, while the remaining brake beams are actuated by a pair of brake cylinders through another set of interconnected rods and levers. Means embodying my invention are provided for moving laterally the brake beam which connects the lower ends of the vertical supporting levers at the forward sides of the forward pair of wheels to cause the brake shoes secured to the upper ends of these levers to follow the lateral movements of the wheels.

Other objects and characteristic features of my invention will become apparent as the description proceeds.

The brake mechanism embodying my invention is an improvement upon that disclosed and claimed in an application for Letters Patent of the United States, Serial No. 326,710, filed by me on March 29, 1940, for Brake mechanism, Patent No. 2,242,015, May 13, 1941.

I shall describe one form of brake mechanism embodying my invention, and shall then point out the novel features thereof in claims.

Figure 6:
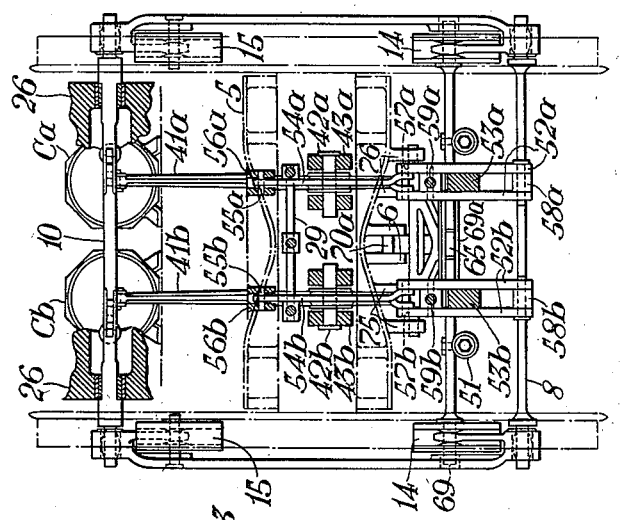
Figure 5:
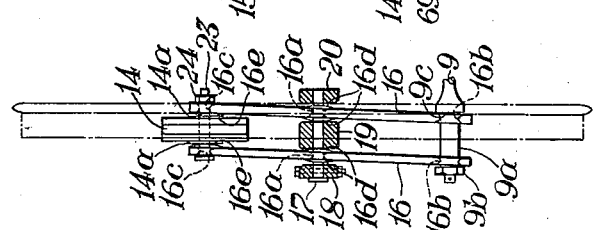
Figure 4:
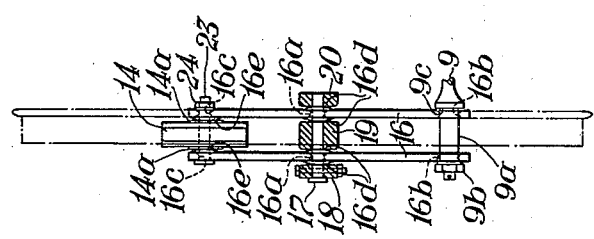
Figure 2:
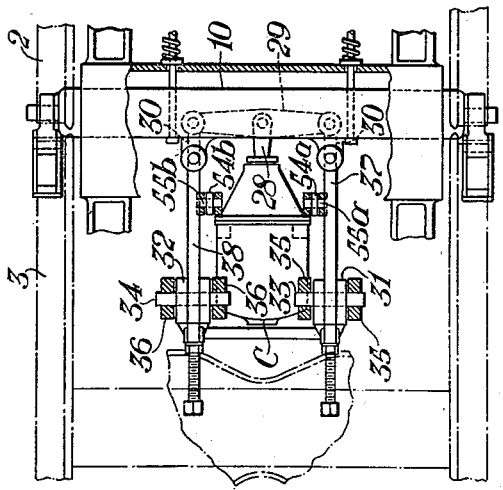
Figure 3:
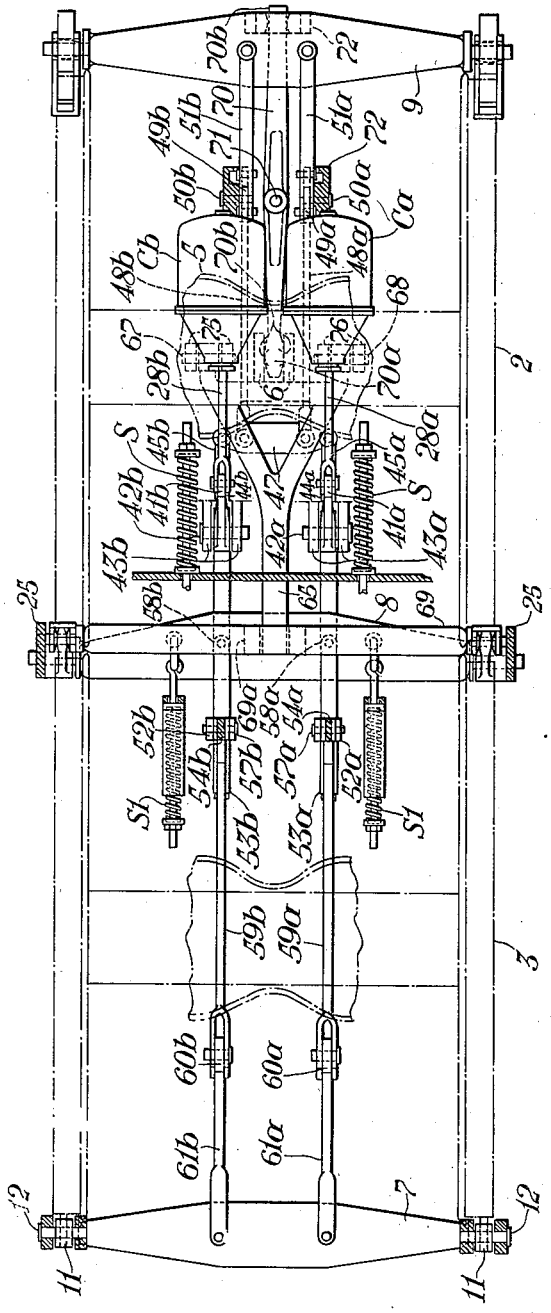

In the accompanying drawings, Fig. 1 is a side elevational view of the third and fourth pairs of driving wheels of a locomotive of the type described having applied thereto brake mechanism embodying my invention. Figs. 2 and 3 are top plan views illustrating different portions of the brake mechanism shown in Fig. 1, certain of the parts being omitted for the sake of clearness. Fig. 4 is a right-hand end view of a portion of the apparatus illustrated in Fig. 1. Fig. 5 is a view similar to Fig. 4 but showing the parts in a different position. Fig. 6 is a fragmentary sectional view taken substantially on the line VI—VI of Fig. 1.

Similar reference characters refer to similar parts in each of the several views.

Referring to the drawings, the locomotive to which I have shown my invention applied is of the type having four pairs of driving wheels, the first and second pairs of which are driven from a first set of steam cylinders and the third and fourth pairs of which are driven from a second set of steam cylinders. All four pairs of driving wheels are mounted in a rigid frame 1, only the third and fourth pairs 2 and 3 of driving wheels being illustrated in the drawings.

Each pair of driving wheels is mounted on an axle comprising a part of a roller bearing axle assembly, the construction of which forms no part of my present invention, and is therefore not shown in detail in the drawings. It should be particularly pointed out, however, that the axle assembly for the front pair of driving wheels 2 is suitably journaled at each end in a journal box (not shown) which is guided by spaced pedestal jaws (not shown) formed in the side member of the frame 1 in such manner that the journal box is free to slide vertically and laterally with respect to the frame, and each axle assembly includes a member 5 (see Figs. 3 and 6) which connects the two journal boxes and is movable laterally therewith. This member may assume a variety of forms depending upon the particular type of roller bearing construction employed, and is here shown as being tubular in construction. This member is referred to in the art by a variety of different designations, but for convenience I shall hereinafter refer to it as an axle housing, although it should be distinctly understood that insofar as my present invention is concerned its exact construction is immaterial so long as it is a non-rotatable member which moves laterally in response to lateral movement of the associated driving wheels. The member 5 is provided at its center with a pair of spaced depending lugs 6 and on opposite sides of the lugs 6 with two other pairs of depending lugs 75 and 76 for a purpose which will appear presently. It should be noted that the wheel and axle assembly just described is free to move laterally through a sufficient distance to permit the wheels to freely follow the track rails on curves without causing undue sidethrust of the flanges of one or the other of the wheels on the adjacent rails, this distance in actual practice being about one inch in either direction from the normal central position.

The wheel and axle assembly for the fourth pair of driving wheels 3 is of the usual construction, and is not adapted to move any appreciable distance laterally with respect to the truck frame. Due to the usual operating clearances, this wheel and axle assembly may at times be moved laterally with respect to the truck frame, but such movement will be so slight that the assembly will at no time strain the brake rigging or interfere with its operation. That is to say, insofar as my present invention is concerned, this latter wheel and axle assembly may be considered as fixed against lateral movement.

It will be observed that the driving wheels 2 and 3 are closely spaced, the distance between these wheels preferably being no greater than the necessary clearances between the wheels themselves will require. The reason for closely spacing the wheels in this manner is to decrease the overall length of the locomotive to a minimum to facilitate its ability to negotiate curves.

Extending transversely of the wheels 2 and 3 considerably below the horizontal plane passing through their centers are brake beams 7, 8 and 9, and extending transversely of the wheels 2 and 3 considerably above the horizontal plane passing through their centers is another brake beam 10, the brake beam 10 being disposed directly above the brake beam 8.

The brake beam 7 is supported for movement toward and away from the wheels 3 between brake applying and brake releasing positions by means of a pair of hanger levers 11, the upper ends of which are pivotally secured to the locomotive frame by means of pins 12 mounted in suitable supports (not shown) and the lower ends of which are pivotally connected with the opposite ends of the brake beam. Secured to each of the levers 11 intermediate its ends is a brake head 14 carrying a brake shoe 15 which, when the brake beam is moved to its brake applying position, is adapted to engage the associated wheel 3 in a zone located some distance below the horizontal plane passing through the axis of the wheels.

The brake beam 9 is supported for swinging movement toward and away from the wheels 2 between brake releasing and brake applying positions by means of two pairs of supporting levers 16, one pair of which is disposed at each end of the beam. Both pairs of levers are alike, and a description of one pair will therefore suffice for both.

Referring to Fig. 4, the two levers 16 of the pair here shown are provided intermediate their ends with aligned holes 16a which receive a supporting pin 17 mounted in spaced lugs 18, 19 and 20 cast integrally with, or otherwise secured to, the engine frame. The levers 16 are further provided at their lower ends with aligned holes 16b which receive the rounded end 9a of the brake beam 9, and at their upper ends with aligned holes 16c which receive a pin 23 secured in place by a nut 24. A nut 9b is screwed onto the outer end of the rounded portion 9a, and this nut, together with a shoulder 9c formed on the brake beam at the inner end of the rounded portion 9a, serves to position the brake beam lengthwise with respect to the supporting levers. The pin 23 supports a brake head 14 carrying a brake shoe 15 which, when the brake beam 9 is moved away from the wheels 2 to its brake applying position, is adapted to engage the associated wheel 2 in a zone located some distance above the horizontal plane passing through the axes of the wheels.

As was pointed out hereinbefore, the wheels 2 are permitted to move laterally through a considerable distance, and in order to permit the levers 16 to be rocked in directions transversely of the locomotive frame, in a manner which will be described hereinafter, through a sufficient distance to maintain the brake shoe 15 carried thereby in lateral alignment with the associated wheel 2, the inner surface of each of the holes 16a, 16b and 16c is rounded in the manner shown. Furthermore, each of the levers 16 is provided on each side of the hole 16a therein with an annular boss 16d having a convex exterior surface which encircles the hole 16a, and on the inner side of the hole 16c therein with a similar annular boss 16e. The spacing between the lugs 18, 19 and 20 is such that the bosses 16d engage these lugs with a line contact in any transverse position to which the levers are moved, and the brake head 14 is provided at each side with a flat boss 14a which likewise engages the associated boss 16e in a line contact in any lateral position to which the levers 16 are moved. The distance between the bosses 14a is the same as the width of the lug 19, and it will be seen, therefore, that the levers 16 in any lateral position to which they are rocked to cause the brake shoe 15 carried thereby to remain in lateral alignment with the tread of the wheel 2 form the two sides of a parallelogram, the remaining two sides of which are formed respectively by the pin 23 and the rounded end 9a of the brake beam 9. The reason for this construction will be made clear presently.

The brake beam 8 is supported for swinging movement toward and away from the wheel 2 between brake applying and brake releasing positions by means of a pair of levers 25. These latter levers are pivotally connected at their lower ends to the opposite ends of the brake beam 8, and are pivotally mounted at their upper ends on the opposite ends of the brake beam 10. The brake beam 10, in turn, is slidably supported adjacent its ends for movement between brake applying and brake releasing positions by means of supporting brackets 26 rigidly attached to the frame 1.

As best seen in Figs. 3 and 6, the central portion of each lever 25 is disposed outside of the plane of the associated wheels, but the upper and lower ends are provided with inwardly offset portions which are disposed within the plane of the wheels and which carry brake heads 14 provided with brake shoes 15. Each upper brake shoe 15 is adapted, when the brake beam 10 is moved to its brake applying position, to engage the adjacent wheel 3 in a zone which is substantially diametrically opposite to the zone at which the brake shoe 15 secured to the lever 11 is adapted to engage this wheel, while each lower brake shoe 15 is adapted, when the brake beam 8 is moved to its brake applying position, to engage the adjacent wheel 2 in a zone which is located substantially diametrically opposite to the zone at which the brake shoe 15 secured to the lever 16 is adapted to engage this wheel.

It should be pointed out that the points of connection between the levers 25 and the brake beams 8 and 10 are of such construction that the lower ends of the levers 25 are permitted to swing laterally through a sufficient arc to enable the lower brake shoes 15 carried by the levers 25 to freely follow the lateral movements of the wheels 2.

The brake mechanism also includes one set of interconnected rods and levers for actuating the brake beam 10 between its brake applying and brake releasing position, and another set of interconnected rods and levers for actuating the remaining brake beams 7, 8 and 9 between their brake applying and brake releasing positions.

Referring first to the set of interconnected rods and levers for actuating the brake beam 10, this set is actuated by a brake cylinder C which is disposed between the wheels 3 in front of the axle connecting these wheels. The brake cylinder 7 is secured to a suitable support 27 provided on the engine frame, and includes the usual cylinder body, reciprocable piston (not shown) biased to the inner end of its stroke by the usual release spring (not shown), and a push rod 28 which is operatively connected with the piston.

The push rod 28 is operatively connected at its outer end with an equalizer lever 29 intermediate its ends, and the equalizer lever 29, in turn, is operatively connected at its ends through the medium of pull rods 30 with the lower ends of two similar laterally spaced vertically extending brake cylinder levers 31 and 32. The brake cylinder levers 31 and 32 are pivotally supported intermediate their ends on spaced pivot pins 33 and 34 mounted in spaced lugs 35 and 36 provided on the engine frame, and are operatively connected at their upper ends through the medium of links 37 and 38 with the brake beam 10 intermediate its ends. The links 37 and 38 include slack adjusters of the usual and well-known construction, and since these slack adjusters are of the usual and well-known construction, they need not be described in detail herein.

The other set of interconnected rods and levers is actuated by a pair of brake cylinders Ca and Cb. These brake cylinders are similar to the previously described brake cylinder C, and are disposed between the wheels 2 on opposite sides of the center line of the locomotive a little to the rear of the axle connecting these wheels. These latter brake cylinders are secured to suitable supports 40 provided on the engine frame.

The push rod 28a of the brake cylinder Ca is pivotally connected at its outer end with the upper end of a vertically disposed brake cylinder lever 41a, and the push rod 28b of the cylinder Cb is similarly pivotally connected at its outer end with the upper end of a vertically disposed brake cylinder lever 41b. The two brake cylinder levers 41a and 41b are pivotally supported intermediate their ends on pivot pins 42a and 42b mounted in spaced lugs 43a and 43b provided on the engine frame, and are pivotally connected at their lower ends with the upper ends of vertically disposed equalizing levers 44a and 44b.

The equalizing levers 44a and 44b, in turn, are connected at their lower ends through the medium of double jaws 45a and 45b with the opposite ends of a horizontally disposed cross beam 47, which latter is operatively connected at points equally spaced from its ends, by means of pull rods 48a and 48b, with the lower ends of vertically disposed transmitting levers 49a and 49b, respectively. The transmitting levers 49a and 49b are pivoted intermediate their ends on pivot pins 50a and 50b carried by the engine frame, and are operatively connected at their upper ends with the brake beam 9 at points equally spaced from its ends by means of push rods 51a and 51b.

The equalizing levers 44a and 44b are connected intermediate their ends with pairs of auxiliary equalizing levers 52a and 52b intermediate their ends through the medium of pull rods 53a and 53b which include slack adjusters of the usual and well-known construction. The auxiliary equalizing levers 52a and 52b are vertically disposed and are suspended from the engine frame by means of hanger links 54a and 54b. The hanger links 54a and 54b are pivoted at their upper ends on pivot pins 55a and 55b mounted in lugs 56a and 56b, and the bifurcated lower ends of these hanger links extend between the upper ends of the associated equalizing levers and receive pins 57a and 57b passing through the links and through the associated levers.

The lower ends of the equalizing levers 52a and 52b are operatively connected by means of jaws 58a and 58b with the brake beam 8 at points equally spaced from its ends.

At points intermediate the pivot pins 57a and 57b and the points of connection of the pull rods 53a and 53b with the auxiliary equalizing levers 52a and 52b, the auxiliary equalizing levers 52a and 52b are connected by means of pull rods 59a and 59b with transmitting levers 60a and 60b intermediate their ends. The transmitting levers 60a and 60b are pivotally secured at their upper ends to the locomotive frame, and are operatively connected at their lower ends with the brake beam 7 at points equally spaced from its ends by means of pull rods 61a and 61b.

When it is desired to apply the brakes, fluid pressure is simultaneously supplied to all three brake cylinders C, Ca and Cb. The fluid pressure supplied to the cylinder C causes the associated push rod 28 to move outwardly in the cylinder in opposition to the bias of the release springs, and this outward movement acts through the associated set of interconnected rods and levers to move the brake beam 10 to its brake applying position in a manner which will be obvious from an inspection of the drawings.

The fluid pressure supplied to the cylinders Ca and Cb likewise causes the push rods 28a and 28b associated with these cylinders to move outwardly, and hence causes the brake cylinder levers 41a and 41b to rotate in counterclockwise directions as viewed in Fig. 1. This movement, in turn, moves the upper ends of the equalizing levers 44a and 44b toward the right, as viewed in Fig. 1, whereby a force is exerted on the equalizing levers 52a and 52b which tends to move them toward the right as viewed in Fig. 1. This latter movement is transmitted through the jaws 58a and 58b to the brake beam 8, and also through the pull rods 59a and 59b, the transmitting levers 60a and 60b, and the pull rods 61a and 61b to the brake beam 7, with the result that these brake beams will move to their brake applying positions and thus cause the lower shoes 15 associated with the wheels 2 and 3 to frictionally engage these wheels as is obvious.

The movement of the upper ends of the equalizing levers 44a and 44b toward the right further causes these levers to rotate in a clockwise direction about their pivots of connection with the pull rods 53a and 53b, and this rotation acts through the pull rods 48a and 48b, the transmitting levers 49a and 49b, and push rods 51a and 51b to move the brake beam 9 away from the wheels 2 to its brake applying position. Since the levers 16 are pivoted intermediate their ends and are pivotally connected at their lower ends to the brake beam 9, the movement of the brake beam 9 away from the wheels 2 moves the brake shoes 15 secured to the upper ends of the levers 16 into frictional engagement with the wheels 2.

It will be seen, therefore, that when the brakes are applied, each wheel will be clasped between a pair of diametrically opposite shoes, and the parts are so proportioned that the braking forces exerted by the shoes will all be approximately equal.

When the fluid supplied to the brake cylinders of the brake mechanism is subsequently vented to atmosphere, the release springs in the brake cylinders will restore the push rods to their retracted positions, which movement removes the force tending to move the brake shoes against the wheels, whereupon the brake beams 7 and 9 will swing by gravity to their brake releasing positions in which the brake shoes 15 secured to the associated levers 11 and 16 will be out of engagement with the wheels 2 and 3. However, the frictional force which exists between the brake beam 10 and the associated supports 26 opposes the movement of this brake beam to its brake releasing position, and the force of gravity opposes the movement of the brake beam 8 to its brake releasing position, and since there is usually a certain amount of unavoidable lost motion between the interconnected rods and levers which actuate the brake beams, the brake shoes attached to the lever 25 will have a tendency to drag.

This tendency is undesirable, and for the purpose of preventing it, the brake beams 10 and 8 are connected with spring units S and S1 respectively for moving these brake beams to their brake releasing positions following a brake application. These spring units are similar to those shown and described in my prior application, Serial No. 326,710, referred to hereinbefore, and since their detail construction is immaterial to my present invention, it is believed to be unnecessary to describe them further herein.

It will be readily understood that inasmuch as the wheels 2 are permitted to move laterally through a considerable distance, it is necessary, in order to obtain efficient braking, to provide means for causing the brake shoes 15 associated with these wheels to remain in lateral alignment with the wheels.

The means for maintaining the brake shoes 15 secured to the lower end of the levers 25 in lateral alignment with the wheels is similar to that described and claimed in my above referred to application, Serial No. 326,710, and comprises briefly a rigid arm 65 which is pivotally attached at one end to the previously described member 5 by means of pivot pins 67 and 68 passing through the lugs 75 and 76 provided on the member 5, and which extends at the other end into an opening formed between a tie bar 69 and an inverted U-shaped bracket 69a which is welded or otherwise secured to the tie bar. The tie bar 69 extends transversely of the engine frame below the plane passing through the wheel centers, and is provided at its ends with rounded portions which pass through the offset portions of the levers 25 and through the associated brake heads 14 and serve as means for attaching the brake heads to the levers 25. Each rounded portion is threaded at its outer end for the reception of a nut which fastens the tie bar to the adjacent lever 25, whereby the levers 25 and the tie bar are constrained to move as a unit.

It will be remembered that the member 5 on which the lugs 75 and 76 are formed is constrained to follow the lateral movements of the wheels 2, and that clearance is provided between the levers 25 and their points of connection with the brake beams 8 and 10 to permit the levers 25 to swing laterally through a sufficient arc to enable the lower brake shoes 15 secured to these levers to freely follow the lateral movements of the wheels. It will be seen, therefore, that when lateral movements of the wheels 2 take place, these movements will be transmitted to the brake shoes 15 through the medium of the lugs 75 and 76, the pins 67 and 68, the arm 65 and the tie bar 69, whereby the brake shoes will remain at all times in lateral alignment with the wheels.

The means for causing the brake shoes 15 attached to the supporting levers 16 to follow the lateral movements of the wheels 2 constitute my present invention, and as here shown this means comprises a rigid arm 70 which is pivotally supported intermediate its ends on a vertical pivot pin 71 for rotation in a horizontal plane. The pivot pin 71 is mounted in a vertical bearing 72 provided on the engine frame which bearing also supports the pivot pins 50a and 50b on which the transmitting levers 49a and 49b are mounted. The left-hand end of the arm 70 as viewed in Figs. 1 and 3 is offset upwardly from the central portion and extends between and cooperates with the previously described depending lugs 6 disposed on the member 5. The lever 70 is provided on each side of the end 70a with rounded bulges 70b which engage the lugs 6 in a vertical line contact, whereby the lever is constrained to rotate about the pivot pin 71 in response to lateral movements of the member 5 without lost motion between the end 70a and the lugs and without causing the end 70a to bind between the lugs. The other end 70b of the lever 70 is offset downwardly from the central portion and is connected with the underside of the brake beam 9 by means of a stirrup 72 welded or otherwise secured to the underside of the brake beam.

With the brake beam 9 thus connected with the member 5 it will be seen that any lateral movement of the member 5 due to lateral movement of the wheels 2 will act through the arm 70 to cause a corresponding lateral movement of the brake beam 9, but that the movement of the brake beam will be in a direction opposite to that of the member 5. Any lateral movement of the brake beam 9 from its normal position will cause the supporting levers 16 to rock about the pivot pins 17 in a direction transverse to the locomotive frame, and will thereby cause the brake shoes 15 secured to the upper ends of the levers 16 to move laterally in the same direction that the member 5 was moved. The parts are so proportioned that the amount of lateral movement of the brake shoes will be the same as that of the wheels 2, whereby the brake shoes 15 carried by the levers 16 will be automatically maintained in lateral alignment with the wheels 2. It should be particularly pointed out that when the brake shoes 15 are thus moved laterally from their normal positions, due to the fact that the pins 23 form one side of a parallelogram in the manner described hereinbefore, these pins will always remain horizontal so that the brake shoe 15 will always remain in the correct vertical position to provide full surface contact with the braking surface of the associated wheel. This is illustrated in Fig. 5 in which the levers 16 of one pair are rotated to one extreme lateral position about the associated pin 17.

Although I have herein shown and described only one form of brake mechanism embodying my invention, it is understood that various changes and modifications may be made therein within the scope of the appended claims without departing from the spirit and scope of my invention.

Having thus described my invention, what I claim is:

1. In a brake mechanism for a railway vehicle having a pair of wheels which are permitted to move laterally relative to the vehicle frame to facilitate the negotiation of curves by the vehicle and a member which moves laterally with the wheels, the combination of a system of operatively connected brake elements including a pair of vertically disposed supporting levers pivotally mounted intermediate their ends at the forward side of each of said wheels and provided at their upper ends with a brake shoe movable into and out of braking engagement with the associated wheels by rotation of the levers about their pivots, a brake beam pivotally connected with and supported by the lower ends of said levers and movable between a brake applying and a brake releasing position, the levers of each pair being free to rock about their pivots in directions transverse to the vehicle through a sufficient distance to permit the brake shoes to align with the wheels in any lateral position to which the wheels are free to move, and means connecting said brake beam with said member and effective to move said brake beam laterally in a direction opposite to the wheels in response to lateral movement of the wheels to maintain the brake shoes in lateral alignment with the wheels.

2. In a brake mechanism for a vehicle having a frame supported by at least two pairs of closely spaced wheels, diametrically opposite brake shoes positioned on opposite sides of each wheel for applying clasp brakes to the wheels, the shoes at the forward sides of the wheels being disposed some distance above, and the shoes at the rear sides of the wheels being disposed some distance below, the plane passing through the wheel axes, a first brake cylinder, a set of operatively associated rods and levers connecting said first brake cylinder with the two brake shoes disposed at the forward sides of the rear pair of wheels, two other brake cylinders, and a set of operatively associated rods and levers connecting said other cylinders with the remaining brake shoes.

3. In a brake mechainsm for a vehicle having a frame supported by at least two pairs of closely spaced wheels, diametrically opposite brake shoes positioned on opposite sides of each wheel for applying clasp brakes to the wheels, the shoes at the forward sides of the wheels being positioned some distance above, and the shoes at the rear sides of the wheels being positioned some distance below, the horizontal plane passing through the wheel axes, vertical levers supporting the shoes disposed between the closely spaced wheels, brake beams connecting said levers at their upper and lower ends, hanger levers supporting the shoes at the rear sides of the rear pair of wheels, a brake beam connected with and supported by said hanger levers, vertical supporting levers pivotally mounted intermediate their ends at the forward sides of the forward pair of wheels and carrying at their upper ends the brake shoes disposed at the forward sides of these wheels, a brake beam connected with said supporting levers at their lower ends and supported thereby, a first set of interconnected rods and levers operatively connected with the upper brake beam disposed between the wheels for moving it between a brake applying and a brake releasing position, and a second set of interconnected rods and levers operatively connected with the remaining brake beams for moving them between brake applying and brake releasing positions.

4. In a brake mechanism for a railway vehicle, diametrically opposite brake shoes disposed on opposite sides of each wheel of one pair of wheels for applying clasp brakes to the wheels, the shoes at the forward sides of the wheels being disposed above and the shoes at the rear sides of the wheels being disposed below, the horizontal plane passing through the wheel axes, levers supporting at their upper ends the brake shoes disposed at the forward sides of the wheels, said levers being pivotally mounted intermediate their ends and being connected at their lower ends by a first brake beam supported thereby, a second brake beam operatively connected with the remaining brake shoes, a pair of brake cylinders, two brake cylinder levers, one actuated by each of said brake cylinders, a pair of equalizer levers each connected at one end with a different one of said brake cylinder levers and each operatively connected intermediate its ends with said other brake beam, a cross beam connected at its ends with the free ends of said equalizer levers, and means connecting said cross beam intermediate its ends with said first brake beam.

5. In a brake mechanism for a railway vehicle, diametrically opposite brake shoes disposed on opposite sides of each wheel of one pair of wheels for applying clasp brakes to the wheels, the shoes at the forward sides of the wheels being disposed above and the shoes at the rear sides of the wheels being disposed below, the horizontal plane passing through the wheel axes, levers supporting at their upper ends the brake shoes disposed at the forward sides of the wheels, said levers being pivotally mounted intermediate their ends and being connected at their lower ends by a first brake beam supported thereby, a second brake beam operatively connected with the remaining brake shoes, a pair of brake cylinders, two brake cylinder levers, one actuated by each of said brake cylinders, a pair of equalizer levers each connected at one end with a different one of said brake cylinder levers and each operatively connected intermediate its ends with said other brake beam, a cross beam connected at its ends with the free ends of said equalizer levers, and means including a pair of vertically disposed transmitting levers for connecting said cross beam with said first brake beam.

6. In a brake mechanism for a railway vehicle, diametrically opposite brake shoes disposed on opposite sides of each wheel of one pair of wheels for applying clasp brakes to the wheels, the shoes at the forward sides of the wheels being disposed above and the shoes at the rear sides of the wheels being disposed below, the horizontal plane passing through the wheel axes, levers supporting at their upper ends the brake shoes disposed at the forward sides of the wheels, said levers being pivotally mounted intermediate their ends and being connected at their lower ends by a first brake beam supported thereby, a second brake beam operatively connected with the remaining brake shoes, a pair of brake cylinders, two brake cylinder levers, one actuated by each of said brake cylinders, a pair of equalizer levers each connected at one end with a different one of said brake cylinder levers and each operatively connected intermediate its ends with said other brake beam, a cross beam connected at its ends with the free ends of said equalizer levers, and a pair of vertically disposed transmitting levers pivotally supported intermediate their ends and operatively connected at one end by means of pull rods with said cross beam and at the other end by means of push rods with said brake beam.

7. In a brake mechanism for a railway vehicle having a frame and two closely spaced wheel and axle assemblies, four brake beams one disposed on each side of each wheel, the brake beam disposed at the forward sides of the rear pair of wheels being disposed some distance above and the remaining brake beams being disposed some distance below the horizontal plane passing through the wheel centers, a first set of interconnected rods and levers operatively connected with the brake beam disposed at the forward side of the rear pair of wheels for actuating it between brake applying and brake releasing positions, a pair of brake cylinders, two brake cylinder levers operatively connected with said two brake cylinders respectively, a first pair of equalizing levers operatively connected at one end with said brake cylinder levers, a second pair of equalizer levers floatingly suspended from the vehicle frame by means of supporting links pivotally attached to the vehicle at their upper ends and operatively connected intermediate their ends with the equalizer levers of said first pair intermediate their ends, means connecting the lower ends of the equalizer levers of said first pair with the brake beam at the forward sides of the forward pair of wheels, and other means operatively connecting the equalizer levers of said second pair on opposite sides of their points of connection with said first pair with the two remaining brake beams.

8. In combination, a railway vehicle including a frame and a frame supporting wheel which is free to move laterally a limited distance as well as a member which moves laterally with said wheel, a brake shoe, lever means for moving said shoe into and out of braking engagement with said wheel, said lever means also being adapted to rock in a direction transverse to said frame to enable said shoe to be moved laterally to permit it to be maintained in lateral alignment with said wheel, and means for rocking said lever including a rigid arm pivotally attached intermediate its ends to said frame and operatively connected at one end with said member and at the other end with said lever means.

9. In combination, a railway vehicle including a frame and a frame supporting wheel which is free to move laterally a limited distance with respect to said frame as well as a member which moves laterally with said wheel, a brake element for braking cooperation with said wheel, and means for maintaining said brake element in lateral alignment with said wheel including a rigid arm pivotally attached intermediate its ends to said frame and operatively connected at one end with said member and at the other end with a brake beam, and lever means pivotally supported intermediate its ends and operatively connected at one end with said brake beam and at the other end with said brake element.

10. In combination, a railway vehicle including a frame and a frame supporting wheel which is free to move lateraly through a limited distance with respect to said frame, a pair of levers pivotally attached to said frame and provided with a brake element movable into and out of braking engagement with said wheel by rotation of said levers about their pivots, said levers being free to rock about said pivots in directions transverse to said frame to permit lateral movement of said brake element to enable it to be maintained in lateral alignment with said wheel, and means operatively connected with said levers for moving said levers about their pivots to move said brake element into and out of braking engagement with said wheel and also to rock said levers in directions transverse to the frame to maintain said brake element in lateral alignment with said wheel.

11. In combination, a railway vehicle including a frame and a frame supporting wheel mounted for lateral movement with respect to said frame, a pair of supporting levers pivotaly attached to said frame intermediate their ends and provided at their upper ends with a brake element adapted to be moved into and out of braking engagement with said wheel by rotation of said levers about their pivots, said levers also being mounted to rock about said pivots in directions transverse to said frame to enable said brake element to be moved laterally to maintain it in lateral alignment with the braking surface of said wheel, and means operatively connected with the lower ends of said levers for moving said levers about their pivots to move said brake element into and out of braking engagement with said wheel and also to rock said levers in directions transverse to the frame to maintain said brake element in lateral alignment with said wheel.

12. In combination, a railway vehicle including a frame supporting wheel and axle assembly arranged for lateral movement with respect to said frame and having a member movable laterally with the wheels, a pair of levers pivotally attached to said frame intermediate their ends and provided at their upper ends with a brake element movable into and out of braking engagement with one of said wheels by rotation of said levers about their pivots, said levers being free to rock about their pivots in directions transverse to said frame through a sufficient distance to permit the necessary lateral movement of said brake element to enable it to be maintained in lateral alignment with said one wheel, means connected with the lower ends of said levers for moving them about their pivots to move said brake element into and out of braking engagement with said one wheel, and other means operatively connecting the lower ends of said levers with said member and acting to rock said levers about their pivots in response to lateral movements of said member to automatically maintain said brake element in lateral alignment with said one wheel.

13. In combination, a railway vehicle including a frame supporting wheel and axle assembly arranged for lateral movement with respect to said frame and having a member movable laterally with the wheels, a pair of levers pivotally attached to said frame intermediate their ends and provided at their upper ends with a brake element movable into and out of braking engagement with one of said wheels by rotation of said levers about their pivots, said levers being free to rock about their pivots in directions transverse to said frame through a sufficient distance to permit the necessary lateral movement of said brake element to enable it to be maintained in lateral alignment with said one wheel, a brake beam connected with the lower ends of said levers, means connected with said brake beam for moving it between brake applying and brake releasing positions, and other means connecting said brake beam with said member and acting to move said brake beam laterally in response to lateral movements of said member to thereby rock said levers about their pivots an amount sufficient to maintain said brake element in lateral alignment with said one wheel.

14. In combination, a railway vehicle including a frame supporting wheel and axle assembly arranged for lateral movement with respect to said frame and having a member movable laterally with the wheels, a pair of levers pivotally attached to said frame intermediate their ends and provided at their upper ends with a brake element movable into and out of braking engagement with one of said wheels by rotation of said levers about their pivots, said levers being free to rock about their pivots in directions transverse to said frame through a sufficient distance to permit the necessary lateral movement of said brake element to enable it to be maintained in lateral alignment with said one wheel, and a rigid arm pivotally attached to said frame intermediate its ends and operatively connected at one end with said member and at the other end with the lower ends of said levers and effective in response to lateral movement of said member to rock said levers about their pivots to thereby maintain said brake element in lateral alignment with said one wheel.

15. In combination, a railway vehicle including a frame supporting wheel and axle assembly arranged for lateral movement with respect to said frame and having a member movable laterally with the wheels, a pair of levers pivotally attached to said frame intermediate their ends and provided at their upper ends with a brake element movable into and out of braking engagement with one of said wheels by rotation of said levers about their pivots, said levers being free to rock about their pivots in directions transverse to said frame through a sufficient distance to permit the necessary lateral movement of said brake element to enable it to be maintained in lateral alignment with said one wheel, a brake beam connected with the lower ends of said levers, means connected with said brake beam for moving it between brake applying and brake releasing positions, and a rigid arm pivotally attached to said frame intermediate its ends and operatively connected at one end with said member and at the other end with said brake beam and acting to move said brake beam laterally in response to lateral movements of said member to thereby rock said levers about their pivots an amount sufficient to maintain said brake element in lateral alignment with said one wheel.

16. In combination, a railway vehicle including a frame and a frame supporting wheel which is free to move laterally through a limited distance with respect to said frame, a pair of levers disposed between three spaced lugs provided on said frame and provided intermediate their ends with a first pair of aligned holes which receive a first pivot pin mounted in said lugs and at their upper ends with a second pair of aligned holes which receive a second pivot pin and at their lower ends with a third pair of aligned holes which receive the rounded end of a brake beam, a brake head carrying a brake shoe for braking engagement with said wheel mounted on said second pivot pin between said levers, the inner surface of each of said holes being rounded to permit said levers to rock about said first pivot pin in directions transverse to said frame and each of said levers being provided on each side of the holes of said first pair with an annular boss having a convex exterior surface and at the inner ends of the holes of said second pair with similar annular bosses, the spacing between said lugs being such that said first mentioned bosses engage said lugs in a line contact in any transverse position to which said levers are moved, said brake head being provided with surfaces which cooperate with said second mentioned bosses and which are spaced apart the same distance as the width of the middle one of said lugs, whereby said second pin will remain horizontal and will maintain said brake shoe vertical in any transverse position to which said levers are moved, and means connected with said brake beam for moving said levers about their pivots to move said brake shoe into and out of braking engagement with said wheel and for moving said brake beam laterally to rock said levers about their pivots to maintain said brake shoe in lateral alignment with said wheel.

EMIL G. MUELLER.